US011977351B2

(12) United States Patent
Watanabe et al.

(10) Patent No.: US 11,977,351 B2
(45) Date of Patent: May 7, 2024

(54) IMAGE FORMING APPARATUS

(71) Applicant: KYOCERA Document Solutions Inc., Osaka (JP)

(72) Inventors: Takuji Watanabe, Osaka (JP); Junichi Nakagawa, Osaka (JP); Kenichi Tamaki, Osaka (JP); Hiroshi Yamazaki, Osaka (JP); Tamotsu Shimizu, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 18/331,704

(22) Filed: Jun. 8, 2023

(65) Prior Publication Data

US 2023/0408974 A1 Dec. 21, 2023

(30) Foreign Application Priority Data

Jun. 16, 2022 (JP) ................................ 2022-097205

(51) Int. Cl.

| | |
|---|---|
| ***G03G 21/20*** | (2006.01) |
| ***G03G 15/02*** | (2006.01) |
| ***G03G 15/06*** | (2006.01) |
| ***G03G 15/09*** | (2006.01) |
| ***G03G 21/00*** | (2006.01) |
| ***G03G 21/10*** | (2006.01) |
| ***G03G 21/18*** | (2006.01) |

(52) U.S. Cl.

CPC ....... *G03G 21/206* (2013.01); *G03G 15/0266* (2013.01); *G03G 15/065* (2013.01); *G03G 15/09* (2013.01); *G03G 21/0047* (2013.01); *G03G 21/0052* (2013.01); *G03G 21/10* (2013.01); *G03G 21/105* (2013.01); *G03G 21/1814* (2013.01); *G03G 2215/00025* (2013.01); *G03G 2221/1645* (2013.01)

(58) Field of Classification Search

CPC .. G03G 15/0266; G03G 15/065; G03G 15/09; G03G 21/0047; G03G 21/0052; G03G 21/10; G03G 21/105; G03G 21/1814; G03G 21/206; G03G 2215/00025; G03G 2221/1645

See application file for complete search history.

(56) References Cited

U.S. PATENT DOCUMENTS

2006/0275048 A1* 12/2006 Nishimura ......... G03G 15/0258 399/92
2016/0378060 A1* 12/2016 Tani ..................... G03G 21/206 399/92
2023/0408973 A1* 12/2023 Nakagawa ............. G03G 15/09

FOREIGN PATENT DOCUMENTS

JP 2020-134775 A 8/2020

* cited by examiner

*Primary Examiner* — Joseph S Wong
(74) *Attorney, Agent, or Firm* — Stein IP, LLC

(57) ABSTRACT

An image forming apparatus includes a development device, and a control unit that controls the development device. The development device includes a toner collection mechanism having a duct, a filter, and an exhaust fan. The duct is connected to a conveyance chamber of the development container and allows air in the conveyance chamber to flow through. The filter is disposed at a connecting part between the duct and the conveyance chamber, and collects toner flowing into the duct from the conveyance chamber. The exhaust fan makes the air in the conveyance chamber flow to the outside via the duct. The control unit changes rotational frequency or operation frequency of the exhaust fan based on current detected by a current detection unit at non-image forming time.

5 Claims, 5 Drawing Sheets

IMAGE FORMING APPARATUS

INCORPORATION BY REFERENCE

This application is based upon and claims the benefit of priority from the corresponding Japanese Patent Application No. 2022-097205 filed Jun. 16, 2022, the entire contents of which are hereby incorporated by reference.

BACKGROUND

The present disclosure relates to an image forming apparatus.

An electrophotographic image forming apparatus, such as a copier or a printer, generally uses a device that supplies toner to an electrostatic latent image formed on a surface of an image carrier such as a photosensitive drum, so as to develop a toner image that is later transferred onto a paper sheet. In order to continuously form uniform images, the image forming apparatus stores developer containing toner in a development container, and stirs and conveys the developer inside the development container.

In a conventional image forming apparatus, it is known that when toner charge amount is lowered, the toner can easily scatter from inside to outside of the development container.

SUMMARY

An image forming apparatus according to one aspect of the present disclosure includes a development device, a voltage application unit, a current detection unit, and a control unit. The development device includes a development container, a developer stirring member, and a developer carrier. The development container stores developer containing toner to be supplied to an image carrier. The developer stirring member is supported in a rotatable manner by the development container, and stirs and conveys the developer so as to circulate the same in a conveyance chamber of the development container. The developer carrier faces the image carrier and is supported in a rotatable manner by the development container so as to supply the toner in the conveyance chamber to the image carrier. The voltage application unit applies a development voltage to the developer carrier. The current detection unit detects current flowing between the developer carrier and the image carrier when the development voltage is applied. The control unit controls the development device and the voltage application unit. The development device includes a toner collection mechanism having a duct, a filter, and an exhaust fan. The duct is connected to the conveyance chamber and allows air in the conveyance chamber to flow through. The filter is disposed at a connecting part between the duct and the conveyance chamber, and collects the toner flowing into the duct from the conveyance chamber. The exhaust fan makes the air in the conveyance chamber flow outside via the duct. The control unit changes rotational frequency or operation frequency of the exhaust fan based on the current detected by the current detection unit at non-image forming time.

DETAILED DESCRIPTION

Hereinafter, an embodiment of the present disclosure is described with reference to the drawings. Note that the present disclosure is not limited to the description below.

Figure 1:
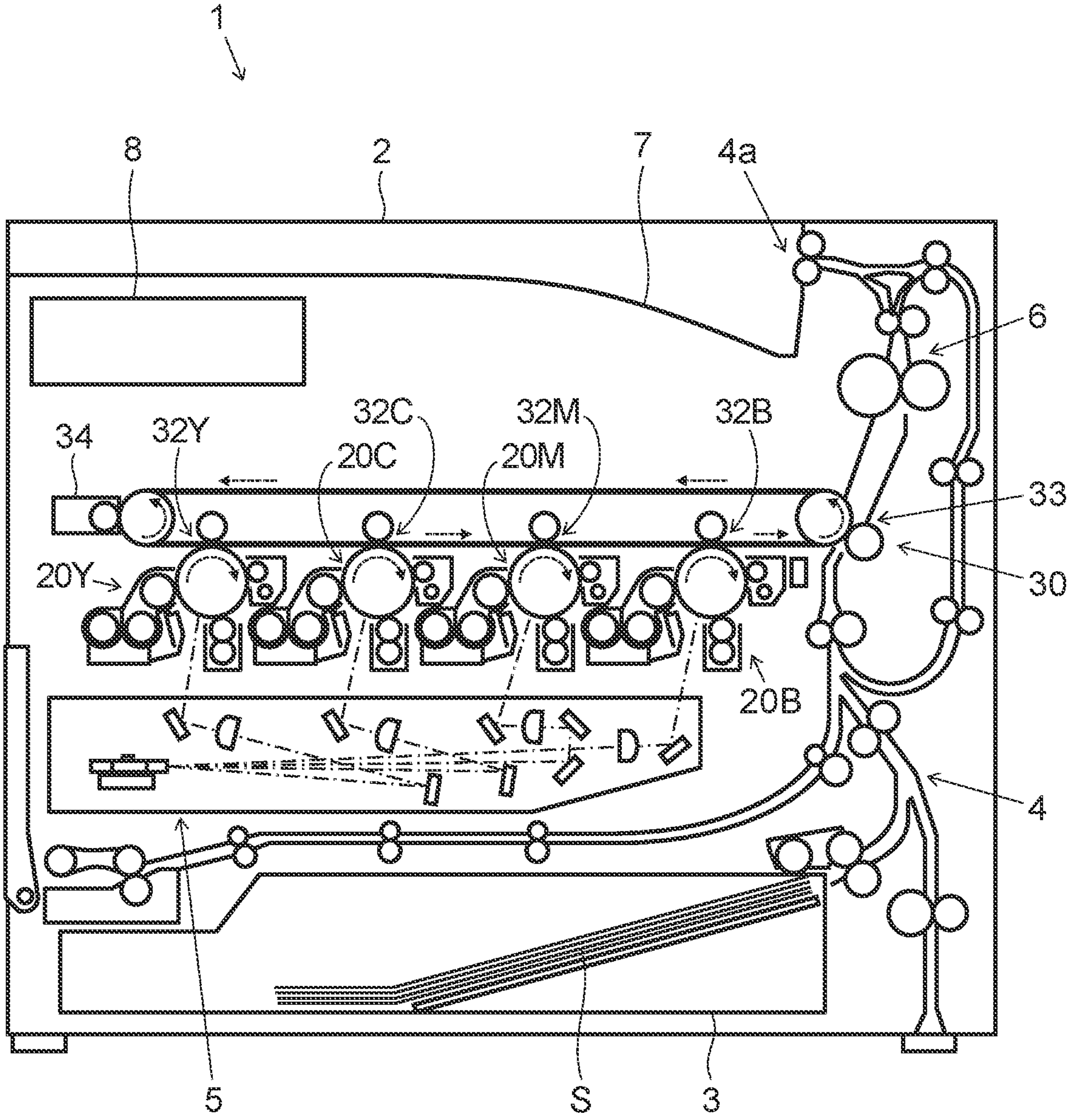
FIG. 1 is a schematic cross-sectional front view of an image forming apparatus according to one embodiment of the present disclosure.
Figure 2:
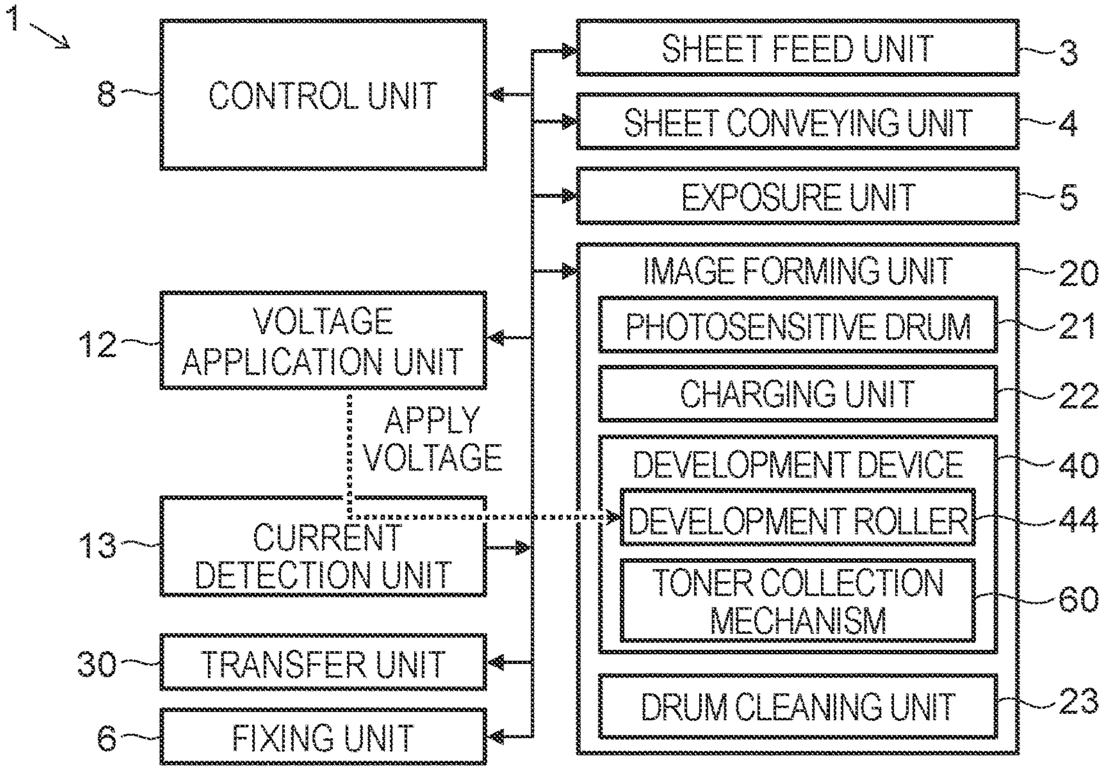
FIG. 2 is a block diagram illustrating a structure of the image forming apparatus of FIG. 1.
Figure 3:
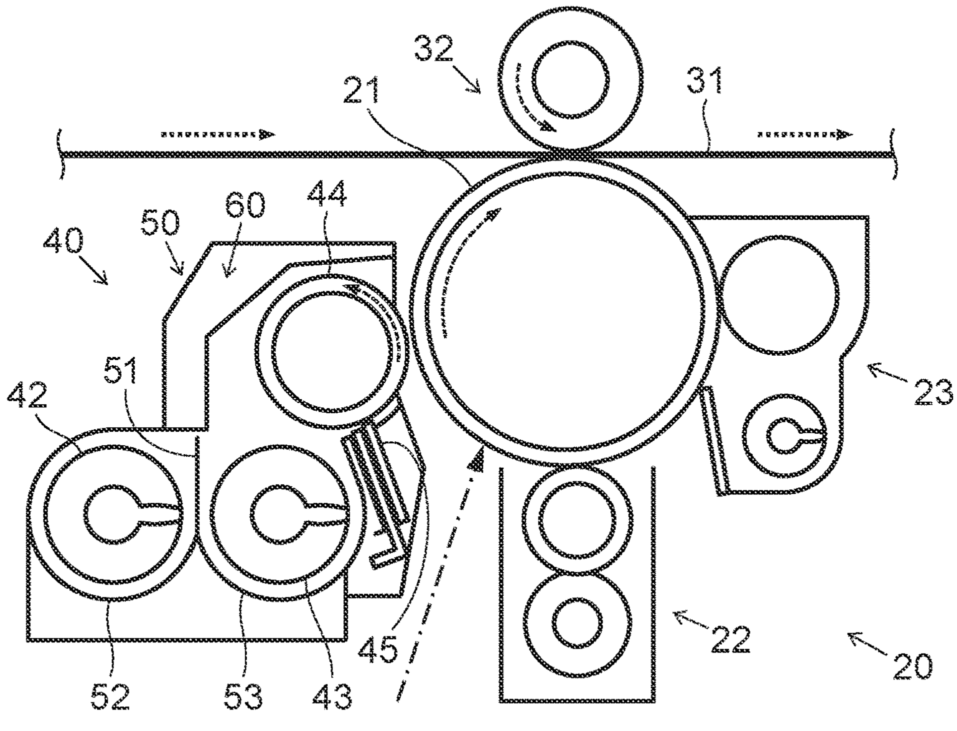
FIG. 3 is a schematic cross-sectional front view of an image forming unit and its vicinity in the image forming apparatus of FIG. 1.

FIG. 1 is a schematic cross-sectional front view of an image forming apparatus 1 of the embodiment. FIG. 2 is a block diagram illustrating a structure of the image forming apparatus 1 of FIG. 1. FIG. 3 is a schematic cross-sectional front view of an image forming unit 20 and its vicinity in the image forming apparatus 1 of FIG. 1. As an example, the image forming apparatus 1 of this embodiment is a tandem color printer that uses an intermediate transfer belt 31 to transfer a toner image onto a paper sheet S. For instance, the image forming apparatus 1 may be a so-called multifunction peripheral having functions such as printing, scanning (image reading), and facsimile transmission.

As illustrated in FIGS. 1, 2, and 3, the image forming apparatus 1 has a main body 2 equipped with a sheet feed unit 3, a sheet conveying unit 4, an exposure unit 5, the image forming unit 20, a transfer unit 30, a fixing unit 6, a sheet discharge unit 7, and a control unit 8.

The sheet feed unit 3 is disposed at a bottom of the main body 2. The sheet feed unit 3 stores a plurality of paper sheets S for printing, and separates and feeds the paper sheets S one by one when printing is performed. The sheet conveying unit 4 extends vertically along a side wall of the main body 2. The sheet conveying unit 4 conveys the paper sheet S fed from the sheet feed unit 3 to a secondary transfer unit 33 and the fixing unit 6 and further discharges the paper sheet S after fixing, to the sheet discharge unit 7 via a sheet discharge port 4*a*. The exposure unit 5 is disposed above the sheet feed unit 3. The exposure unit 5 emits a laser beam controlled based on image data toward the image forming unit 20.

The image forming unit 20 is disposed above the exposure unit 5 and below the intermediate transfer belt 31. The image forming unit 20 includes a yellow image forming unit 20Y a cyan image forming unit 20C, a magenta image forming unit 20M, and a black image forming unit 20B. These four image forming units 20 have the same basic structure. Therefore, in the following description, the identification letters "Y", "C", "M", and "B" indicating the colors may be omitted except a case where it is necessary to identify the color.

The image forming unit 20 includes a photosensitive drum (image carrier) 21 supported in a rotatable manner in a predetermined direction (clockwise direction in FIGS. 1 and 3). The image forming unit 20 further includes a charging unit 22, a development device 40, and a drum cleaning unit 23, which are disposed around the photosensitive drum 21 in a rotation direction thereof. Note that a primary transfer unit 32 is disposed between the development device 40 and the drum cleaning unit 23.

The photosensitive drum 21 is formed in a cylindrical shape extending in a horizontal direction and has a photosensitive layer on the outer circumferential surface. The charging unit 22 charges the outer circumferential surface of the photosensitive drum 21 at a predetermined potential. The exposure unit 5 exposes the outer circumferential surface of the photosensitive drum 21 charged by the charging unit 22, so as to form an electrostatic latent image of a document image on the outer circumferential surface of the photosensitive drum 21. The development device 40 supplies toner to this electrostatic latent image to develop the same, and forms a toner image. The four image forming units 20 form toner images of different colors. After the toner images are primarily transferred onto an outer circumferential surface of the intermediate transfer belt 31, the drum cleaning unit 23 removes the toner and the like remaining on the surface of the photosensitive drum 21 to clean the same. In this way, the image forming unit 20 forms the image (toner image) that is later transferred onto the paper sheet S.

The transfer unit 30 includes the intermediate transfer belt 31, the primary transfer units 32Y, 32C, 32M, and 32B, the secondary transfer unit 33, and a belt cleaning unit 34. The intermediate transfer belt 31 is disposed above the four image forming unit 20. The intermediate transfer belt 31 is an endless intermediate transfer body, which is supported in a rotatable manner in a predetermined direction (counterclockwise direction in FIG. 1), and onto which the toner images formed by the four image forming units 20 are primarily transferred sequentially in an overlapping manner. The four image forming units 20 are arranged in a row from upstream side to downstream side in a rotation direction of the intermediate transfer belt 31, as a so-called tandem system.

The primary transfer units 32Y, 32C, 32M, and 32B are disposed above the image forming units 20Y, 20C, 20M, and 20B of individual colors with the intermediate transfer belt 31 between them. The secondary transfer unit 33 is disposed on the upstream side of the fixing unit 6 in a sheet conveying direction of the sheet conveying unit 4, and on the downstream side of the four image forming units 20Y, 20C, 20M, and 20B in the rotation direction of the intermediate transfer belt 31. The belt cleaning unit 34 is disposed on the downstream side of the secondary transfer unit 33 in the rotation direction of the intermediate transfer belt 31.

The primary transfer unit 32 transfers the toner image formed on the outer circumferential surface of the photosensitive drum 21 onto the intermediate transfer belt 31. In other words, the toner images are primarily transferred onto the outer circumferential surface of the intermediate transfer belt 31 by the primary transfer units 32Y, 32C, 32M, and 32B of individual colors. Further, when the intermediate transfer belt 31 rotates, the toner images of the four image forming units 20 are transferred onto the intermediate transfer belt 31 sequentially at predetermined timings in an overlapping manner, and hence the toner images of yellow, cyan, magenta, and black colors are overlaid to form a color toner image on the outer circumferential surface of the intermediate transfer belt 31.

The color toner image on the outer circumferential surface of the intermediate transfer belt 31 is transferred onto the paper sheet S that has been conveyed by the sheet conveying unit 4 in a synchronous manner, at a secondary transfer nip formed in the secondary transfer unit 33. After the secondary transfer, the belt cleaning unit 34 removes deposits such as the toner remaining on the outer circumferential surface of the intermediate transfer belt 31 to clean the same. In this way, the transfer unit 30 transfers (records) the toner image formed on the outer circumferential surface of the photosensitive drum 21 onto the paper sheet S.

The fixing unit 6 is disposed above the secondary transfer unit 33. The fixing unit 6 heats and presses the paper sheet S with the transferred toner image so as to fix the toner image to the paper sheet S.

The sheet discharge unit 7 is disposed above the transfer unit 30. The paper sheet S after the toner image is fixed, i.e. after printing is completed, is conveyed to the sheet discharge unit 7. The sheet discharge unit 7 allows the paper sheet (printed matter) to be taken out from top side.

The control unit 8 includes a CPU, an image processing section, a storage section, and other electronic circuits and components (which are not shown in the drawings). The CPU controls operations of individual structural elements of the image forming apparatus 1 based on a control program and data stored in the storage section, so as to perform processing related to functions of the image forming apparatus 1. The sheet feed unit 3, the sheet conveying unit 4, the exposure unit 5, the image forming unit 20, the transfer unit 30, and the fixing unit 6 are instructed individually by the control unit 8 and cooperate with each other so as to print on the paper sheet S. The storage section is constituted of a combination of a nonvolatile storage device such as a program read only memory (ROM) and a data ROM, and a volatile storage device such as a random access memory (RAM).

In addition, the image forming apparatus 1 further includes a voltage application unit 12, and a current detection unit 13 as illustrated in FIG. 2.

For instance, the voltage application unit 12 includes a power supply unit and a control circuit (which are not shown in the drawings). The voltage application unit 12 is electrically connected to a development roller 44 of the development device 40, which is described later. The voltage application unit 12 applies a development voltage to the development roller 44. The control unit 8 controls application timing, a voltage value, a polarity, application period, and the like of the development voltage applied to the development roller 44, via the voltage application unit 12.

The current detection unit 13 detects current flowing between the photosensitive drum 21 and the development roller 44 when the development voltage is applied to the development roller 44. The control unit 8 receives information about the current detected by the current detection unit 13, from the current detection unit 13.

Figure 4:
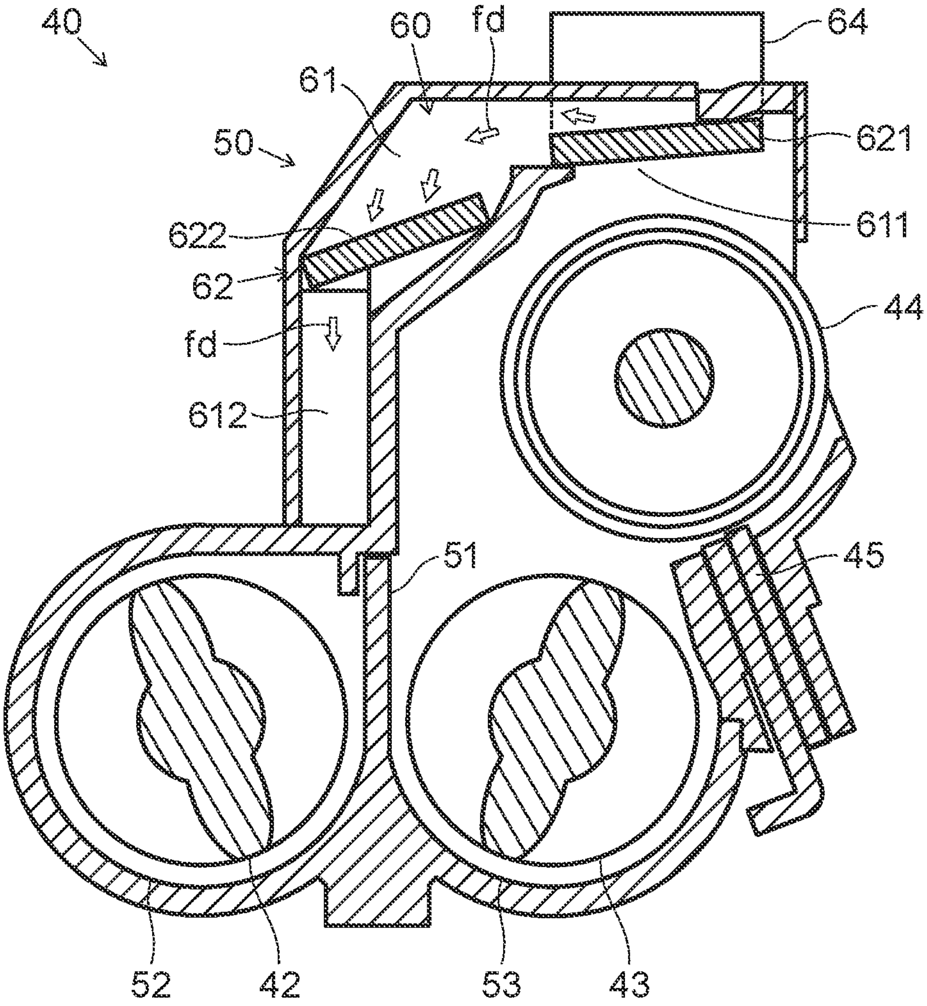
FIG. 4 is a vertical cross-sectional front view of a development device in the image forming unit of FIG. 3.
Figure 5:
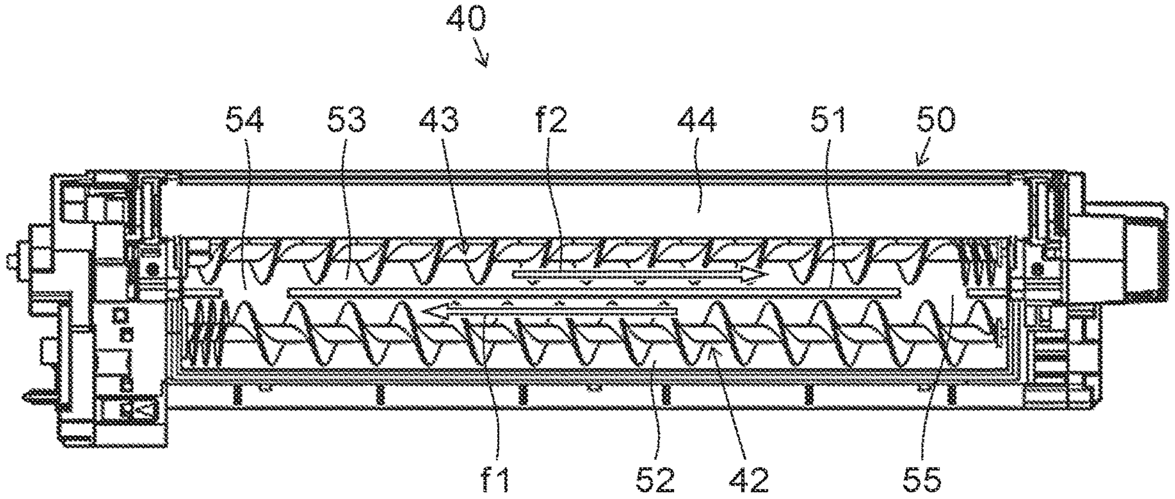
FIG. 5 is a horizontal cross-sectional plan view of the development device in the image forming unit of FIG. 3.
Figure 6:
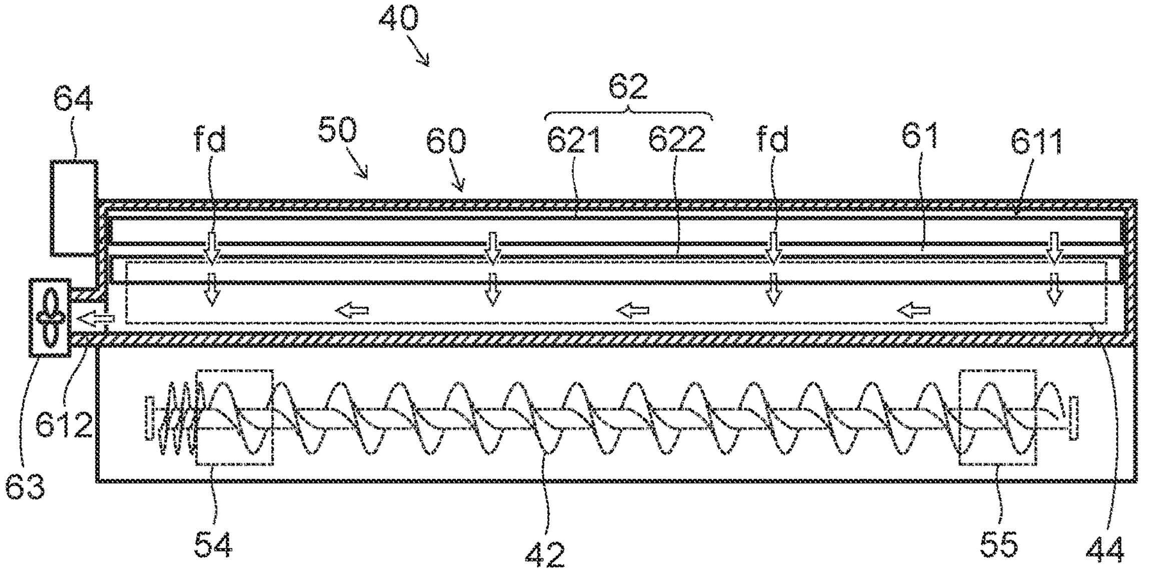
FIG. 6 is a vertical cross-sectional side view of the development device in the image forming unit of FIG. 3.

Next, a structure of the development device 40 is described with reference to FIGS. 4, 5, and 6 in addition to FIGS. 2 and 3. FIGS. 4, 5, and 6 are a vertical cross-sectional front view of the development device 40 in the image forming unit 20 of FIG. 3, a horizontal cross-sectional plan view of the same, and a vertical cross-sectional side view of the same. Note that the development devices 40 of individual colors have the same basic structure, and hence identification letters indicating colors and descriptions of individual structural elements are omitted. In addition, in this description, an “axial direction” means a rotation axial direction of each of the photosensitive drum 21, a first conveying member 42, a second conveying member 43, and the development roller 44, which extend in parallel with each other (in the thickness direction of paper of FIGS. 3 and 4, and in the left and right direction in FIGS. 5 and 6).

The development device 40 supplies toner to the outer circumferential surface of the photosensitive drum 21. The development device 40 can be attached and detached from the main body 2 of the image forming apparatus 1, for example. The development device 40 includes a development container 50, the first conveying member (developer conveying member) 42, the second conveying member (developer conveying member) 43, the development roller (developer carrier) 44, and a regulating member 45.

The development container 50 has an elongated shape extending in the axial direction of the photosensitive drum 21, and is disposed so that the longitudinal direction is the horizontal direction. In other words, the longitudinal direction of the development container 50 is parallel to the axial direction of the photosensitive drum 21. The development container 50 stores two-component developer containing toner and magnetic carrier, for example, as the developer containing toner to be supplied to the photosensitive drum 21. The developer may be magnetic one-component developer containing magnetic toner or nonmagnetic one-component developer, for example.

The development container 50 includes a partition 51, a first conveyance chamber 52, a second conveyance chamber 53, a first communication part 54, and a second communication part 55.

The partition 51 is disposed inside the development container 50 in a lower part. The partition 51 is disposed at substantially the center in a direction crossing the longitudinal direction of the development container 50 (the left and right direction in FIG. 4, the up and down direction in FIG. 5). The partition 51 is formed in a substantially plate shape extending in the longitudinal direction of the development container 50 and in the up and down direction. The partition 51 divides the inside of the development container 50 in the direction crossing the longitudinal direction.

The first conveyance chamber 52 and the second conveyance chamber 53 are formed inside the development container 50. The first conveyance chamber 52 and the second conveyance chamber 53 are formed by dividing the inside of the development container 50 by the partition 51. The first conveyance chamber 52 and the second conveyance chamber 53 are disposed in parallel with each other at substantially the same height.

The second conveyance chamber 53 is disposed adjacent to under the disposition area of the development roller 44 in the development container 50. The first conveyance chamber 52 is disposed apart more from the development roller 44 than the second conveyance chamber 53 in the development container 50. The first conveyance chamber 52 is connected to a developer replenishment tube (not shown), so that developer is replenished to the first conveyance chamber 52 through the developer replenishment tube. In the first conveyance chamber 52, the first conveying member 42 conveys the developer in a first direction f1. In the second conveyance chamber 53, the second conveying member 43 conveys the developer in a second direction f2 that is opposite to the first direction f1.

The first communication part 54 and the second communication part 55 are disposed outside the ends of the partition 51 in the longitudinal direction, respectively. The first communication part 54 and the second communication part 55 allow the first conveyance chamber 52 and the second conveyance chamber 53 to communicate to each other, in a direction crossing the longitudinal direction of the partition 51 (the left and right direction in FIG. 4, the up and down direction in FIG. 5), i.e., in a thickness direction of the partition 51 having a substantially plate shape. In other words, the first communication part 54 and the second communication part 55 allow the first conveyance chamber 52 and the second conveyance chamber 53 to communicate to each other at both end sides in the longitudinal direction thereof.

The first communication part 54 allows a downstream end of the first conveyance chamber 52 in the first direction f1 and an upstream end of the second conveyance chamber 53 in the second direction f2 to communicate to each other. In the first communication part 54, the developer is conveyed from the first conveyance chamber 52 to the second conveyance chamber 53. The second communication part 55 allows a downstream end of the second conveyance chamber 53 in the second direction f2 and an upstream end of the first conveyance chamber 52 in the first direction f1 to communicate to each other. In the second communication part 55, the developer is conveyed from the second conveyance chamber 53 to the first conveyance chamber 52.

The first conveying member 42 is disposed in the first conveyance chamber 52. The second conveying member 43 is disposed in the second conveyance chamber 53. The second conveying member 43 is adjacent to the development roller 44 and extends in parallel to the same. The first conveying member 42 and the second conveying member 43 are supported by the development container 50 in a rotatable manner about axes extending in parallel with the development roller 44 and in the horizontal direction. The first conveying member 42 and the second conveying member 43 have the same basic structure, in which a helical blade is formed on an outer periphery of a rotation shaft extending in the longitudinal direction of the development container 50.

In the first conveyance chamber 52, the first conveying member 42 stirs and conveys the developer in the rotation axial direction, i.e., in the first direction f1 from the second communication part 55 to the first communication part 54. In the second conveyance chamber 53, the second conveying member 43 stirs and conveys the developer in the rotation axial direction, i.e., in the second direction f2 from the first communication part 54 to the second communication part 55. In other words, the first conveying member 42 and the second conveying member 43 stir and convey the developer in directions opposite to each other, so as to circulate the developer in a predetermined circulation direction.

The development roller 44 is disposed above the second conveying member 43 in the development container 50, so as to face the photosensitive drum 21. The development roller 44 is supported by the development container 50 in a rotatable manner about an axis extending in parallel with an axis of the photosensitive drum 21. The development roller 44 includes a cylindrical development sleeve that rotates in the counterclockwise direction in FIGS. 3 and 4 for example, and a development roller magnetic pole fixed inside the development sleeve (which are not shown in the drawings).

A part of the outer circumferential surface of the development roller 44 is exposed from the development container 50, faces the photosensitive drum 21, and is close to the same. The outer circumferential surface of the development roller 44 carries the toner, which is supplied to the outer circumferential surface of the photosensitive drum 21 from the area facing the photosensitive drum 21. The development roller 44 carries the toner in the second conveyance chamber 53 of the development container 50 and supplies the toner to the photosensitive drum 21. In other words, the development roller 44 allows the toner in the second conveyance chamber 53 to adhere to the electrostatic latent image on the outer circumferential surface of the photosensitive drum 21, so as to form the toner image.

The regulating member 45 is disposed at the upstream side of the facing area between the development roller 44 and the photosensitive drum 21 in the rotation direction of the development roller 44. The regulating member 45 is close to and faces the development roller 44, so that a predetermined space is formed between the distal end of the regulating member 45 and the outer circumferential surface of the development roller 44. The regulating member 45 extends over the entire length of the development roller 44 in the axial direction. The regulating member 45 regulates a layer thickness of the developer (toner), which is carried on the outer circumferential surface of the development roller 44 and passes through a gap between the distal end of the regulating member 45 and the outer circumferential surface of the development roller 44.

When the first conveying member 42 and the second conveying member 43 rotate, the developer in the development container 50 passes through the first communication part 54 and the second communication part 55, so as to circulate between the first conveyance chamber 52 and the second conveyance chamber 53 in the predetermined circulation direction. At this time, the toner in the development container 50 is stirred and charged, and is carried on the outer circumferential surface of the development roller 44. The toner carried on the outer circumferential surface of the development roller 44 is regulated in layer thickness by the regulating member 45, and then is conveyed to the facing area between the development roller 44 and the photosensitive drum 21 by rotation of the development roller 44. When the predetermined development voltage is applied to the development roller 44, the toner carried on the outer circumferential surface of the development roller 44 moves to the outer circumferential surface of the photosensitive drum 21 in the facing area, due to a potential difference to the potential of the outer circumferential surface of the photosensitive drum 21. In this way, the electrostatic latent image on the outer circumferential surface of the photosensitive drum 21 is developed by the toner.

Next, a more detailed structure of the development device 40 is described with reference to FIGS. 4, 5, and 6. Note that FIGS. 4 and 6 have arrows indicating air flow directions fd in a duct 61.

The development device 40 is equipped with a toner collection mechanism 60. The toner collection mechanism 60 includes the duct 61, a filter 62, an exhaust fan 63, and a vibration generating unit 64. The filter 62 includes a first filter 621 and a second filter 622.

The duct 61 is disposed adjacent to the second conveyance chamber 53. The duct 61 faces the photosensitive drum 21 via the disposition area of the development roller 44 in the development container 50, in a direction crossing the longitudinal direction of the development container 50 (the left and right direction in FIG. 4, in the thickness direction of paper of FIG. 6). The duct 61 is connected to the second conveyance chamber 53 at the upstream end in the air flow direction. The duct 61 allows air in the second conveyance chamber 53 to flow through. The duct 61 has an air inlet 611 and an air outlet 612.

The air inlet 611 is a connecting part of the duct 61 with the second conveyance chamber 53 and is disposed above the development roller 44. In other words, the air inlet 611 is positioned at the upstream end of the duct 61 in the air flow direction. The air inlet 611 opens over the entire length of the second conveyance chamber 53 in the longitudinal direction. The air inlet 611 is formed in a rectangular shape elongated in the longitudinal direction of the second conveyance chamber 53 for example, and faces the development roller 44. The air inlet 611 allows the inside of the second conveyance chamber 53 and the inside of the duct 61 to communicate to each other. The air inside the second conveyance chamber 53 passes through the air inlet 611 and flows into the duct 61.

The air outlet 612 is disposed in the back of the development container 50, for example. The air outlet 612 is positioned at the downstream end of the duct 61 in the air flow direction. The air inside the second conveyance chamber 53 passes through the air outlet 612 and is discharged from the duct 61. Note that the duct 61 may be connected to another exhaust air path at the air outlet 612, which has a fan in the main body 2.

The exhaust fan 63 is connected to the air outlet 612. When the exhaust fan 63 is driven, the air inside the second conveyance chamber 53 is forced to pass through the duct 61 and be discharged externally. In other words, the exhaust fan 63 makes the air inside the second conveyance chamber 53 flow outside through the duct 61.

The first filter 621 is disposed at the air inlet 611 that is the connecting part between the duct 61 and the second conveyance chamber 53. The first filter 621 has the same shape as the air inlet 611 and is formed in a rectangular shape elongated in the longitudinal direction of the second conveyance chamber 53, for example. The first filter 621 covers the air inlet 611. In other words, the first filter 621 faces the development roller 44. The first filter 621 is made of nonwoven fabric, for example, and collects toner contained in the air flowing from the second conveyance chamber 53 into the duct 61.

The second filter 622 is disposed on the downstream side of the first filter 621 in the air flow direction in the duct 61. The second filter 622 has the same cross-sectional shape as that of the duct 61 in a direction crossing the air flow direction inside the same, and is formed in a rectangular shape elongated in the longitudinal direction of the second conveyance chamber 53, for example. The second filter 622 covers an air flow cross section in the duct 61. The second filter 622 is made of nonwoven fabric, for example, and collects toner contained in the air that passes through the first filter 621 and flows in the duct 61.

TABLE 1

| | pressure loss (mmAq) (@10 cm/s) | 0.3 μm collection efficiency (%) (@10 cm/s) | 8 μm collection efficiency (%) (@30 cm/s) |
|---|---|---|---|
| first filter | 0.42 | 78 | 95 |
| second filter | 4.50 | 90 | 99 |

Table 1 shows an example of performances of the first filter 621 and the second filter 622. When the upstream side static pressure and the downstream side static pressure are measured at an air flow rate of 10 cm/s, the pressure loss of the first filter 621 is 0.42 mmAq, while the pressure loss of the second filter 622 is 4.5 mmAq. Further, both the 0.3 μm collection efficiency and the 8 μm collection efficiency have higher values in the second filter 622 than in the first filter 621.

According to the above structure of the filter 62, the first filter 621 can have a structure that does not collect much toner in the second conveyance chamber 53, so that it hardly cause clogging. Furthermore, the second filter 622 can prevent the toner from leaking to the outside of the development container 50.

The vibration generating unit 64 is disposed adjacent to the back surface of the development container 50, for example. The vibration generating unit 64 includes, for example, a vibration motor, a control substrate, and other electronic circuits and components (which are not shown in the drawings). A vibration weight is attached to an output shaft of the vibration motor, and the center of gravity of the vibration weight is shifted from the rotation axis of the output shaft.

The vibration generating unit 64 is connected to the first filter 621. When the vibration motor is driven, the vibration generating unit 64 vibrates the first filter 621. With this structure, as the vibration generating unit 64 vibrates the first filter 621, it is possible to allow the toner collected by the first filter 621 to drop. Therefore, performance of the first filter 621 can be recovered, and it is possible to continuously prevent toner from scattering to the outside of the development container 50.

EXAMPLE

There is described below a relationship among developing current, white ground current, and toner scattering amount.

Figure 7:
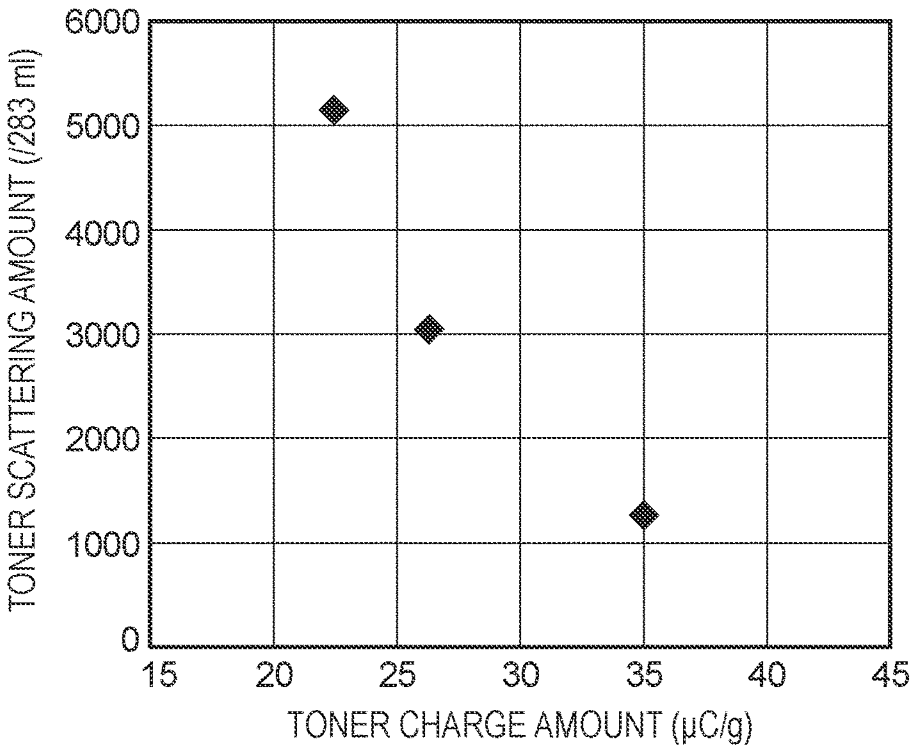
FIG. 7 is a graph illustrating a relationship between toner charge amount and toner scattering amount in the image forming apparatus of FIG. 1.

FIG. 7 is a graph illustrating a relationship between toner charge amount and toner scattering amount in the image forming apparatus 1 of FIG. 1. In the graph of FIG. 7, the horizontal axis is the toner charge amount, and the vertical axis is the toner scattering amount. The toner scattering amount is measured using a particle counter (particle measuring instrument) that counts particles contained in air or liquid. Toner particles are counted at an air flow rate of 283 ml. It is understood from FIG. 7 that the toner scattering amount increases along with decrease in the toner charge amount.

Figure 8:
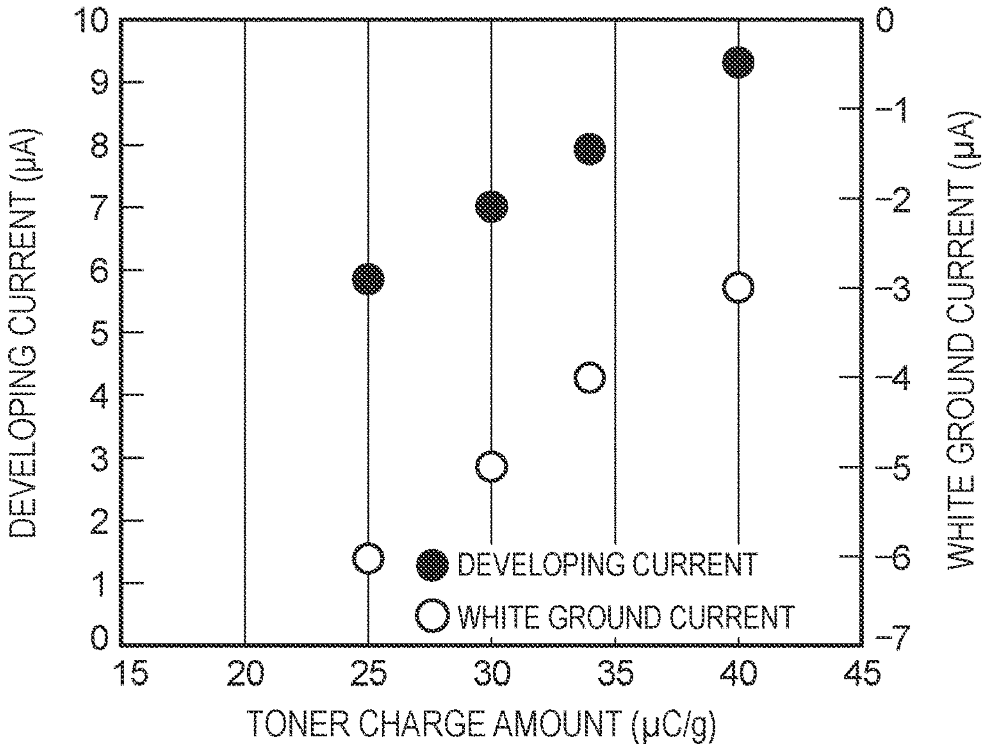
FIG. 8 is a graph illustrating a relationship among developing current, white ground current, and toner charge amount in the image forming apparatus of FIG. 1.

FIG. 8 is a graph illustrating a relationship among developing current, white ground current, and toner charge amount in the image forming apparatus 1 of FIG. 1. In the graph of FIG. 8, the horizontal axis is the toner charge amount, the left-side vertical axis is the developing current, and the right-side vertical axis is the white ground current. Note that the "white ground" means a white background of the paper sheet or a space between paper sheets, which is a non-image forming area where no image is formed. In other words, the "white ground current" means current that flows between the photosensitive drum 21 and the development roller 44 at "non-image forming time", which is other timing than "image forming time" when an image is formed on the paper sheet based on image data received from an external computer or the like. On the other hand, the "developing current" means current that flows between the photosensitive drum 21 and the development roller 44 at "image forming time". It is understood from FIG. 8 that the toner charge amount decreases along with decrease in the developing current or the white ground current.

On the basis of FIGS. 7 and 8 that are obtained by the experiment performed in advance, the relationship between the developing current and the toner scattering amount, and the relationship between the white ground current and the toner scattering amount can be derived. Out of these relationships, the relationship between the white ground current and the toner scattering amount is stored in advance as an information table in the storage section or the like of the image forming apparatus 1, and can be used by the control unit 8 at any time. In this way, for preventing toner from scattering in the image forming apparatus 1, the control unit 8 changes rotational frequency or operation frequency of the exhaust fan 63 based on the current (white ground current) detected by the current detection unit 13 at non-image forming time.

With the structure described above, the exhaust fan 63 is controlled based on the current flowing between the development roller 44 and the photosensitive drum 21, at non-image forming time corresponding to the white ground of the paper sheet S or between paper sheets, for example. In this way, it is not necessary to form a toner image on the photosensitive drum 21, and no down time occurs. Therefore, it is possible to suppress toner consumption and occurrence of down time, and it is possible to prevent toner from scattering in the image forming apparatus 1.

Next, timing of toner collection by the exhaust fan 63 and timing of filter cleaning by the vibration generating unit 64 were evaluated. In contrast to the image forming apparatus 1 of Example of the present disclosure, in the image forming apparatus of Comparative example 1, the exhaust fan 63 and the vibration generating unit 64 were controlled based on the current (developing current) detected by the current detection unit in a fixed pattern that is a predetermined datum image, at non-image forming time. In addition, in the image forming apparatus of Comparative example 2, a transition of the toner charge amount was obtained in advance by a durability test, and the exhaust fan 63 and the vibration generating unit 64 were controlled by predicting the toner charge amount.

As a condition of the image forming apparatus for the evaluation, a resin belt was used as the intermediate transfer belt 31, for example. The gap (space) of the facing area between the photosensitive drum 21 and the development roller 44 is 0.375 mm. The potential of the surface of the photosensitive drum 21 is 160 to 350 V, the AC voltage applied to the development roller 44 is 900 to 1,300 V, and the DC bias voltage is 90 to 280 V. The images on the printed paper sheet were at high density (20%), and 100,000 sheets of paper were continuously printed. Note that these conditions are an example.

In the evaluation of the timing of toner collection by the exhaust fan 63, the exhaust fan 63 was operated very 500 sheets of printed paper, and the current was detected by the current detection unit 13. The result is shown in Table 2. In Table 2, "toner consumption" is an operating condition of the apparatus of each example; it is not consumed in Example as control at non-image forming time, it is consumed in Comparative example 1 as control at image forming time, and it is not consumed in Comparative example 2.

TABLE 2

| | toner | collection detection | | toner scatter |
|---|---|---|---|---|
| | consumption | accuracy | timing | checking |
| Example | not consumed | ±5% | good | good |
| Comparative example 1 | consumed | ±5% | acceptable | acceptable |
| Comparative example 2 | not consumed | ±20% | not acceptable | not acceptable |

In Table 2, "collection detection accuracy" is the maximum value of difference to suction measurement in which the exhaust fan 63 is operated. As criterion of "collection detection timing", "good" is a case where measurement can be performed in each printing without occurrence of down time, "acceptable" is a case where slight down time has occurred, and "not acceptable" is a case where down time corresponding to one paper sheet or more has occurred. For toner scatter checking, the particle counter was disposed around the development device 40, and the number of particles of toner that scattered outside the development device 40 was counted. As criterion of “toner scatter checking”, “good” is a case of 500/283 ml or less, “acceptable” is a case of 501-999/283 ml, and “not acceptable” is 1000/283 ml or more.

As understood from Table 2, in toner collection detection in Comparative example 1, the accuracy is good, but the timing has slight down time, while in Comparative example 2, the timing is good, but the detection accuracy is a little lowered. Further, toner scattering amount is increased in Comparative example 1 and in Comparative example 2. Compared to these Comparative examples, in Example of the present disclosure, both the accuracy and the timing are good in the toner collection detection, and the toner scattering amount is little.

Further, it is preferred that the control unit 8 increases the rotational frequency or the operation frequency of the exhaust fan 63 along with decrease in current (white ground current) detected by the current detection unit 13 at non-image forming time. With this structure, it is possible to improve the effect of preventing toner from scattering in the image forming apparatus 1.

In the evaluation of the timing of filter cleaning by the vibration generating unit 64, current detection by the current detection unit 13 was performed every 500 sheets of printed paper. Note that the suction by the exhaust fan 63 was performed always at the maximum output. The result is shown in Table 3. In Table 3, “toner consumption” is an operating condition of the apparatus of each example; it is not consumed in Example as control at non-image forming time, it is consumed in Comparative example 1 as control at image forming time, and it is not consumed in Comparative example 2.

TABLE 3

| | toner consumption | filter cleaning timing detection |
|---|---|---|
| Example | not consumed | good |
| Comparative example 1 | consumed | not acceptable |
| Comparative example 2 | not consumed | not acceptable |

For this evaluation, a pressure gage is disposed on the downstream side of the filter 62 in the air flow direction, and suction efficiency of the exhaust fan 63 was calculated based on pressure increase from start of the experiment. In Table 3, as criterion of “filter cleaning timing detection”, “good” is a case where the filter cleaning timing is detected at suction efficiency of 80 to 90% of the filter 62, and “not acceptable” is a case where the filter cleaning timing is detected at suction efficiency of 80% or less, or 90% or more of the filter 62.

As understood from Table 3, in Comparative example 1 and in Comparative example 2, the filter cleaning timing is detected at suction efficiency of 80% or less, or 90% or more of the filter 62, which is not good timing. In contrast, in Example of the present disclosure, the filter cleaning timing is detected at suction efficiency of 80 to 90% of the filter 62, which is good timing.

On the basis of the above evaluation, the control unit 8 of Example of the present disclosure changes the operation frequency of the vibration generating unit 64 based on current (white ground current) detected by the current detection unit 13 at non-image forming time. With this structure, it is possible to recover performance of the first filter 621 based on toner amount collected by the filter 62. Therefore, it is possible to improve the effect of continuously prevent toner from scattering to the outside of the development container 50.

Further, it is preferred that the control unit 8 increases the operation frequency of the vibration generating unit 64 along with decrease in current (white ground current) detected by the current detection unit 13 at non-image forming time. With this structure, it is possible to improve the effect of preventing toner from scattering in the image forming apparatus 1.

Although the embodiment of the present disclosure is described above, the present disclosure is not limited to this embodiment and can be variously modified for implementation, within the scope of the disclosure without deviating from the spirit thereof.

For instance, in the above embodiment, the image forming apparatus 1 is a so-called tandem type image forming apparatus for color printing, in which a plurality of colors of images are overlaid and formed sequentially, but this type is not a limitation. The image forming apparatus may be a non-tandem type image forming apparatus for color printing or an image forming apparatus for monochrome printing.

What is claimed is:

1. An image forming apparatus comprising:

a development device including a development container that stores developer containing toner to be supplied to an image carrier, a developer conveying member that is supported in a rotatable manner by the development container, and stirs and conveys the developer so as to circulate the same in a conveyance chamber of the development container, and a developer carrier that faces the image carrier and is supported in a rotatable manner by the development container so as to supply the toner in the conveyance chamber to the image carrier;

a voltage application unit that applies a development voltage to the developer carrier;

a current detection unit that detects current flowing between the developer carrier and the image carrier when the development voltage is applied; and a control unit that controls the development device and the voltage application unit, wherein the development device includes a toner collection mechanism having a duct that is connected to the conveyance chamber and allows air in the conveyance chamber to flow through, a filter that is disposed at a connecting part between the duct and the conveyance chamber and collects the toner flowing into the duct from the conveyance chamber, and an exhaust fan that makes the air in the conveyance chamber flow outside via the duct, and the control unit changes rotational frequency or operation frequency of the exhaust fan based on the current detected by the current detection unit at non-image forming time.

2. The image forming apparatus according to claim 1, wherein the control unit increases the rotational frequency or the operation frequency of the exhaust fan along with decrease in the current detected by the current detection unit at non-image forming time.

3. The image forming apparatus according to claim 1, wherein the toner collection mechanism includes a vibration generating unit that vibrates the filter, and the control unit changes operation frequency of the vibration generating unit based on the current detected by the current detection unit at non-image forming time.

4. The image forming apparatus according to claim 3, wherein the control unit increases the operation frequency of the vibration generating unit along with decrease in the current detected by the current detection unit at non-image forming time.

5. The image forming apparatus according to claim 1, wherein the filter includes:

a first filter, which covers an air inlet opening over the entire length of the conveyance chamber in the longitudinal direction, so as to allow the inside of the conveyance chamber and the inside of the duct to communicate to each other, and a second filter disposed on the downstream side of the first filter in an air flow direction in the duct, so as to cover an air flow cross section in the duct.

* * * * *